United States Patent
Thomas et al.

(10) Patent No.: US 7,792,552 B2
(45) Date of Patent: Sep. 7, 2010

(54) EYEGLASSES FOR WIRELESS COMMUNICATIONS

(75) Inventors: C. Douglass Thomas, Campbell, CA (US); Peter P. Tong, Mountain View, CA (US)

(73) Assignee: IpVenture, Inc., Los Altos, CA (US)

( * ) Notice: Subject to any disclaimer, the term of this patent is extended or adjusted under 35 U.S.C. 154(b) by 0 days.

(21) Appl. No.: 10/822,218

(22) Filed: Apr. 12, 2004

(65) Prior Publication Data

US 2006/0003803 A1   Jan. 5, 2006

Related U.S. Application Data (60) Provisional application No. 60/527,565, filed on Dec. 8, 2003, provisional application No. 60/509,631, filed on Oct. 9, 2003, provisional application No. 60/462,591, filed on Apr. 15, 2003.

(51) Int. Cl.
   *H04M 1/00*   (2006.01)
(52) U.S. Cl. ............... 455/569.1; 455/556.1; 455/90.3; 455/575.1
(58) Field of Classification Search ............. 455/90.2, 455/90.3, 556.1, 569.1, 575.1, 575.2, 344, 455/347, 350, 351; 379/433.01, 433.1, 434
   See application file for complete search history.

(56) References Cited

U.S. PATENT DOCUMENTS

| | | | |
|---|---|---|---|
| 320,558 A | 6/1885 | Hull | |
| 669,949 A | 3/1901 | Underwood | |
| 1,255,265 A | 2/1918 | Zachara | |
| 1,917,745 A | 7/1933 | Weiss | |
| 2,249,572 A | 7/1941 | Lieber | |
| 2,638,532 A | 5/1953 | Brady | |
| 2,794,085 A | 5/1957 | DeAngelis | |
| 2,818,511 A | 12/1957 | Ullery et al. | |
| 2,830,132 A | 4/1958 | Borg | |
| 2,904,670 A | 9/1959 | Calmes | |
| 3,060,308 A | 10/1962 | Fortuna | |
| 3,597,054 A | 8/1971 | Winter | |
| 3,710,115 A | 1/1973 | Jubb | |
| 4,165,487 A | 8/1979 | Corderman | |
| 4,254,451 A | 3/1981 | Cochran, Jr. | |
| 4,283,127 A | 8/1981 | Rosenwinkel et al. | |

(Continued)

FOREIGN PATENT DOCUMENTS

CN   88203065   11/1988

(Continued)

OTHER PUBLICATIONS

"±1.5g Dual Axis Micromachined Accelerometer", Freescale Semiconductor, Inc., Motorola Semiconductor Technical Data, MMA6260Q, 2004, pp. 1-7.

(Continued)

*Primary Examiner*—Quochien B Vuong (57) ABSTRACT

A pair of eyeglasses that includes wireless communication capabilities is disclosed. The eyeglasses are referred to herein as "wireless eyeglasses." The eyeglasses can also include one or more operation indicators. The wireless eyeglasses can allow a user to communicate with a communication device in a wireless and hands-free manner. The one or more operation indicators that can be provided with the wireless eyeglasses can signal operational status of the wireless communication circuitry.

25 Claims, 5 Drawing Sheets

U.S. PATENT DOCUMENTS

| | | | |
|---|---|---|---|
| 4,322,585 A | 3/1982 | Liautaud | |
| 4,348,664 A | 9/1982 | Boschetti et al. | |
| 4,389,217 A | 6/1983 | Baughman et al. | |
| 4,526,473 A | 7/1985 | Zahn, III | |
| 4,535,244 A | 8/1985 | Burnham | |
| 4,608,492 A | 8/1986 | Burnham | |
| 4,683,587 A | 7/1987 | Silverman | |
| 4,751,691 A | 6/1988 | Perera | |
| 4,757,714 A | 7/1988 | Purdy et al. | |
| 4,773,095 A | 9/1988 | Zwicker et al. | |
| 4,806,011 A | 2/1989 | Bettinger | |
| 4,822,160 A | 4/1989 | Tsai | |
| 4,822,161 A | 4/1989 | Jimmy | |
| 4,851,686 A | 7/1989 | Pearson | |
| 4,942,629 A | 7/1990 | Stadlmann | |
| 4,962,469 A | 10/1990 | Ono et al. | |
| 4,985,632 A | 1/1991 | Bianco et al. | |
| 5,008,548 A | 4/1991 | Gat | |
| 5,020,150 A | 5/1991 | Shannon | |
| 5,036,311 A | 7/1991 | Moran et al. | |
| 5,050,150 A * | 9/1991 | Ikeda | 369/44.27 |
| 5,093,576 A | 3/1992 | Edmond et al. | |
| 5,148,023 A | 9/1992 | Hayashi et al. | |
| 5,151,600 A | 9/1992 | Black | |
| 5,161,250 A | 11/1992 | Ianna et al. | |
| 5,172,256 A | 12/1992 | Sethofer et al. | |
| 5,306,917 A | 4/1994 | Black et al. | |
| 5,353,378 A | 10/1994 | Hoffman et al. | |
| 5,359,370 A | 10/1994 | Mugnier | |
| 5,367,345 A | 11/1994 | da Silva | |
| 5,379,464 A | 1/1995 | Schleger et al. | |
| 5,382,986 A | 1/1995 | Black et al. | |
| 5,394,005 A | 2/1995 | Brown et al. | |
| 5,452,480 A | 9/1995 | Ryden | |
| 5,455,640 A | 10/1995 | Gertsikov | |
| 5,457,751 A | 10/1995 | Such | |
| 5,500,532 A | 3/1996 | Kozicki | |
| D369,167 S | 4/1996 | Hanson et al. | |
| 5,510,961 A | 4/1996 | Peng | |
| 5,513,384 A | 4/1996 | Brennan et al. | |
| 5,533,130 A | 7/1996 | Staton | |
| 5,581,090 A | 12/1996 | Goudjil | |
| 5,585,871 A | 12/1996 | Linden | |
| 5,589,398 A | 12/1996 | Krause et al. | |
| 5,590,417 A * | 12/1996 | Rydbeck | 455/575.2 |
| 5,608,808 A | 3/1997 | da Silva | |
| 5,634,201 A | 5/1997 | Mooring | |
| 5,686,727 A | 11/1997 | Reenstra et al. | |
| 5,715,323 A | 2/1998 | Walker | |
| 5,737,436 A | 4/1998 | Boyden et al. | |
| 5,900,720 A | 5/1999 | Kallman et al. | |
| 5,941,837 A | 8/1999 | Amano et al. | |
| 5,946,071 A | 8/1999 | Feldman | |
| 5,966,746 A | 10/1999 | Reedy et al. | |
| 5,980,037 A | 11/1999 | Conway | |
| 5,988,812 A * | 11/1999 | Wingate | 351/158 |
| 5,992,996 A | 11/1999 | Sawyer | |
| 5,995,592 A * | 11/1999 | Shirai et al. | 455/557 |
| 6,010,216 A * | 1/2000 | Jesiek | 351/158 |
| 6,013,919 A | 1/2000 | Schneider et al. | |
| 6,028,627 A | 2/2000 | Helmsderfer | |
| 6,046,455 A | 4/2000 | Ribi et al. | |
| 6,060,321 A | 5/2000 | Hovorka | |
| 6,061,580 A | 5/2000 | Altschul et al. | |
| 6,091,546 A | 7/2000 | Spitzer | |
| 6,091,832 A * | 7/2000 | Shurman et al. | 381/381 |
| 6,115,177 A | 9/2000 | Vossler | |
| 6,132,681 A | 10/2000 | Faran et al. | |
| 6,154,552 A | 11/2000 | Koroljow et al. | |
| 6,176,578 B1 | 1/2001 | Green et al. | |
| 6,225,897 B1 * | 5/2001 | Doyle et al. | 340/468 |
| 6,231,181 B1 | 5/2001 | Swab | |
| 6,236,969 B1 | 5/2001 | Ruppert et al. | |
| 6,243,578 B1 * | 6/2001 | Koike | 455/557 |
| 6,259,367 B1 | 7/2001 | Klein | |
| 6,270,466 B1 | 8/2001 | Weinstein et al. | |
| 6,292,213 B1 | 9/2001 | Jones | |
| 6,301,367 B1 | 10/2001 | Boyden et al. | |
| 6,307,526 B1 | 10/2001 | Mann | |
| 6,343,858 B1 | 2/2002 | Zelman | |
| 6,349,001 B1 | 2/2002 | Spitzer | |
| 6,349,422 B1 | 2/2002 | Schleger et al. | |
| 6,409,338 B1 | 6/2002 | Jewell | |
| 6,426,719 B1 | 7/2002 | Nagareda et al. | |
| 6,478,736 B1 | 11/2002 | Mault | |
| 6,506,142 B2 | 1/2003 | Itoh et al. | |
| 6,513,532 B2 | 2/2003 | Mault et al. | |
| 6,517,203 B1 | 2/2003 | Blum et al. | |
| 6,539,336 B1 | 3/2003 | Vock et al. | |
| 6,542,081 B2 | 4/2003 | Torch | |
| 6,546,101 B1 * | 4/2003 | Murray et al. | 379/433.02 |
| 6,554,763 B1 | 4/2003 | Amano et al. | |
| 6,619,799 B1 | 9/2003 | Blum et al. | |
| 6,629,076 B1 * | 9/2003 | Haken | 704/271 |
| 6,729,726 B2 * | 5/2004 | Miller et al. | 351/158 |
| 6,736,759 B1 | 5/2004 | Stubbs et al. | |
| 6,764,194 B1 | 7/2004 | Cooper | |
| 6,792,401 B1 | 9/2004 | Nigro et al. | |
| 6,912,386 B1 * | 6/2005 | Himberg et al. | 455/425 |
| 6,929,365 B2 | 8/2005 | Swab et al. | |
| 6,947,219 B1 | 9/2005 | Ou | |
| 7,013,009 B2 * | 3/2006 | Warren | 455/90.3 |
| 7,031,667 B2 * | 4/2006 | Horiguchi | 455/74 |
| 7,073,905 B2 | 7/2006 | Da Pra' | |
| 7,192,136 B2 | 3/2007 | Howell et al. | |
| 7,255,437 B2 | 8/2007 | Howell et al. | |
| 7,265,358 B2 | 9/2007 | Fontaine | |
| 7,274,292 B2 | 9/2007 | Velhal et al. | |
| 7,312,699 B2 | 12/2007 | Chornenky | |
| 7,331,666 B2 | 2/2008 | Swab et al. | |
| 7,376,238 B1 | 5/2008 | Rivas et al. | |
| 7,380,936 B2 | 6/2008 | Howell et al. | |
| 7,429,965 B2 | 9/2008 | Weiner | |
| 2001/0005230 A1 | 6/2001 | Ishikawa | |
| 2002/0017997 A1 | 2/2002 | Felkowitz | |
| 2002/0081982 A1 | 6/2002 | Schwartz et al. | |
| 2002/0084990 A1 | 7/2002 | Peterson, III | |
| 2002/0089639 A1 | 7/2002 | Starner et al. | |
| 2002/0090103 A1 | 7/2002 | Calisto, Jr. | |
| 2002/0098877 A1 | 7/2002 | Glezerman | |
| 2002/0109600 A1 | 8/2002 | Mault et al. | |
| 2002/0140899 A1 | 10/2002 | Blum et al. | |
| 2002/0197961 A1 | 12/2002 | Warren | |
| 2003/0018274 A1 | 1/2003 | Takahashi et al. | |
| 2003/0022690 A1 | 1/2003 | Beyda et al. | |
| 2003/0032449 A1 | 2/2003 | Giobbi | |
| 2003/0062046 A1 | 4/2003 | Wiesmann et al. | |
| 2003/0065257 A1 | 4/2003 | Mault et al. | |
| 2003/0067585 A1 | 4/2003 | Miller et al. | |
| 2003/0068057 A1 | 4/2003 | Miller et al. | |
| 2003/0083591 A1 | 5/2003 | Edwards et al. | |
| 2003/0226978 A1 | 12/2003 | Ribi et al. | |
| 2004/0000733 A1 | 1/2004 | Swab et al. | |
| 2004/0063378 A1 | 4/2004 | Nelson | |
| 2004/0096078 A1 | 5/2004 | Lin | |
| 2004/0100384 A1 | 5/2004 | Chen et al. | |
| 2004/0150986 A1 | 8/2004 | Chang | |
| 2004/0156012 A1 | 8/2004 | Jannard et al. | |
| 2004/0157649 A1 | 8/2004 | Jannard et al. | |
| 2004/0160571 A1 | 8/2004 | Jannard | |
| 2004/0160572 A1 | 8/2004 | Jannard | |
| 2004/0160573 A1 | 8/2004 | Jannard et al. | |
| 2005/0067580 A1 | 3/2005 | Fontaine | |
| 2005/0213026 A1 | 9/2005 | Da Pra' | |

| | | |
|---|---|---|
| 2005/0230596 A1 | 10/2005 | Howell et al. |
| 2005/0243719 A1 | 11/2005 | Howell et al. |
| 2005/0248717 A1 | 11/2005 | Howell et al. |
| 2005/0264752 A1 | 12/2005 | Howell et al. |
| 2006/0023158 A1 | 2/2006 | Howell et al. |
| 2006/0107822 A1 | 5/2006 | Bowen |
| 2006/0132382 A1 | 6/2006 | Jannard |
| 2007/0098192 A1 | 5/2007 | Sipkema |
| 2007/0109491 A1 | 5/2007 | Howell et al. |
| 2007/0186330 A1 | 8/2007 | Howell et al. |
| 2007/0208531 A1 | 9/2007 | Darley et al. |
| 2007/1020853 | 9/2007 | Darley et al. |
| 2007/0270663 A1 | 11/2007 | Ng et al. |
| 2007/0271065 A1 | 11/2007 | Gupta et al. |
| 2007/0271116 A1 | 11/2007 | Wysocki et al. |
| 2007/0271387 A1 | 11/2007 | Lydon et al. |
| 2008/0068559 A1 | 3/2008 | Howell et al. |
| 2008/0262392 A1 | 10/2008 | Ananny et al. |

FOREIGN PATENT DOCUMENTS

| | | |
|---|---|---|
| CN | 89214222.7 | 3/1990 |
| CN | 90208199.3 | 11/1990 |
| EP | 1134491 A2 | 9/2001 |
| FR | 2530039 A1 | 1/1984 |
| GB | 1467982 | 3/1977 |
| JP | 58-113912 | 7/1983 |
| JP | 58-113914 | 7/1983 |
| JP | 02-181722 | 7/1990 |
| JP | 09-017204 | 1/1997 |
| JP | 10-161072 | 6/1998 |
| JP | 2000-039595 | 2/2000 |
| JP | 2002 341059 A | 11/2002 |
| TW | 484711 | 6/2001 |
| WO | WO 97/12205 A1 | 4/1997 |
| WO | WO 99/50706 | 10/1999 |
| WO | WO 02/06881 A2 | 1/2002 |
| WO | WO 03/069394 A1 | 8/2003 |
| WO | WO 03/100368 A1 | 12/2003 |
| WO | WO 2004/012477 A2 | 2/2004 |
| WO | WO 2004/025554 A1 | 3/2004 |

OTHER PUBLICATIONS

"APA Announces Shipment of the SunUV™ Personal UV Monitor", Press Release, Nov. 7, 2003, pp. 1-3.
"Camera Specs Take Candid Snaps", BBC News, Sep. 18, 2003, pp. 1-3.
"Cardo Wireless Attaching Clips and Wearing Headset", Cardo Systems, Inc., http://www.cardowireless.com/clips.php, downloaded Nov. 27, 2004, pp. 1-3.
"Environmental Health Criteria 14: Ultraviolet Radiation", International Programme on Chemical Safety, World Health Organization Geneva, 1979 http://www.ichem.org., pp. 1-102.
"Eyetop", Product-Features, eyetop eyewear, eyetop belt worn, http://www.eyetop.net/products/eyetop/features.asp., downloaded Nov. 6, 2003, pp. 1-2.
"Exclusive Media Event Marks Debut of Oakley Thump: World's First Digital Audio Eyewear", Oakley Investor Relations, Press Release, Nov. 15, 2004, pp. 1-2.
"Heart Rate Monitors", http://www.healthgoods.com, downloaded Dec. 4, 2004.
"How is the UV Index Calculated", SunWise Program, U.S. Environmental Protection Agency, http://www.epa.gov/sunwise/uvcalc.html, downloaded Oct. 14, 2004, pp. 1-2.
"Industrial UV Measurements", APA Optics, Inc., http://www.apaoptics.com/uv/, downloaded Jul. 12, 2004, p. 1.
"Motorola and Oakley Introduce First Bluetooth Sunglasses-Cutting Edge RAZRWire Line Offers Consumers On-The-Go Connections", Motorola Mediacenter-Press Release, Feb. 14, 2005, pp. 1-2.
"Oakley Thump: Sunglasses Meet MP3 Player", with image, http://news.designtechnica.com/article4665.html, Jul. 13, 2004.
"Personal UV monitor," Optics.org, http://optics.org/articles/news/6/6/7/1 (downloaded Dec. 20, 2003), Jun. 9, 2000, pp. 1-2.

"SafeSun Personal Ultraviolet Light Meter", http://healthchecksystems.com/safesun.htm, downloaded Jul. 12, 2004, pp. 1-4.
"SafeSun Personal UV Meter", Introduction, Optix Tech Inc., http://www.safesun.com, downloaded Feb. 5, 2004, pp. 1-2.
SafeSun Personal UV Meter, features, Optix Tech Inc., http://www.safesun.com/features.html, downloaded May 1, 2004, pp. 1-2.
"Sharper Image—The FM Pedometer", e-Corporate Gifts.com, http://www.e-corporategifts.com/sr353.html, downloaded Jan. 22, 2005, pp. 1-2.
"Sun UV™ Personal UV Monitor", APA Optics, Inc., http://www.apaoptics.com/sunuv/uvfacts.html, downloaded Dec. 20, 2003, pp. 1-3.
"Ultraviolet Light and Sunglasses", Oberon's Frequently Asked Questions, http://www.oberoncompany.com/OBEnglish/FAQUV.html, downloaded Feb. 5, 2004, pp. 1-2.
"Ultraviolet Light Sensor", Barrett & Associates Engineering, http://www.barrettengineering.com/project_uvs.htm, downloaded Feb. 5, 2004, pp. 1-3.
"Ultraviolet Radiation (UVR)", Forum North, Ontario Ministry of Labour, http://www3.mb.sympatico.ca/~ericc/ULTRAVIOLET%20RADIATION.htm, downloaded Feb. 5, 2004, pp. 1-6.
"What Are Gripples?", Gripping Eyewear, Inc., http://www.grippingeyewear.com/whatare.html, downloaded Nov. 2, 2005.
Abrisa Product Information: Cold Mirrors, Abrisa, date unknown, p. 1.
Abrisa Product Information: Commercial Hot Mirror, Abrisa, date unknown, p. 1.
Alps Spectable, Air Conduction Glass, Bone Conduction Glass, htt;://www.alps-inter.com/spec.htm, downloaded Dec. 10, 2003, pp. 1-2.
Altimeter and Compass Watches, http://store.yahoo.com/snowshack/altimeter-watches.html, downloaded May 3, 2004, pp. 1-2.
Bone Conduction Headgear HG16 Series, "Voiceducer," http://www.temco-j.co.jp/html/English/HG16.html, downloaded Dec. 10, 2003, pp. 1-3.
Carnoy, David, "The Ultimate MP3 Player for Athletes? Could be.", CNET Reviews, May 14, 2004, pp. 1-4.
Clifford, Michelle A., "Accelerometers Jump into the Consumer Goods Market", Sensors Online, http://www.sensorsmag.com, Aug. 2004.
Cool Last Minute Gift Ideas!, UltimateFatBurner Reviews and Articles, http://www.ultimatefatburner.com/gift-ideas.html, downloaded May 10, 2005, pp. 1-3.
Comfees.com, Adjustable Sports Band Style No. 1243, http://shop.store.yahoo.com/comfees/adsporbansty.html, downloaded Apr. 18, 2003, pp. 1-2.
Dixen, Brian, "ear-catching", Supertesten, Mobil, date unknown, pp. 37-41.
Global Solar UV Index, A Practical Guide, World Health Organization, 2002, pp. 1-28.
Grobart, Sam, "Digit-Sizing Your Computer Data", News Article, Sep. 2004, p. 1.
Life Monitor V1.1, Rhusoft Technologies Inc., http://www.rhusoft.com/lifemonitor/, Mar. 1, 2003, pp. 1-6.
Manes, Stephen, "Xtreme Cam", Forbes Magazine, Sep. 5, 2005, p. 96.
Mio, PhysiCal, http://www.gophysical.com/, downloaded Jan. 27, 2004, 5 pages.
NIWA, "UV Index Information", http://www.niwa.cri.nz/services/uvozone/uvi-info, downloaded Jul. 15, 2004, pp. 1-2.
Pärkkä, Juha, et al., "A Wireless Wellness Monitor for Personal Weight Management", VTT Information Technology, Tampere, Finland, date unknown, p. 1.
Pedometer, Model HJ-112, Omron Instruction Manual, Omron Healthcare, Inc., 2003, pp. 1-27.
PNY Announces Executive Attaché USB 2.0 Flash Drive and Pen Series, Press Release, PNY Technologies, Las Vegas, Jan. 8, 2004, pp. 1-2.
PNY Technologies, "Executive Attaché" http://www.pny.com/products/flash/execattache.asp downloaded Nov. 16, 2005.

Polar WM41 and 42 weight management monitor, http://www.simplysports/polar/weight_management/wm41-42.htm, downloaded Jan. 28, 2004, pp. 1-3.

Questions Answers, Pedometer.com, http:/www.pedometer.com, downloaded May 5, 2005.

RazrWire, Motorola, 2005, 1 page.

SafeSun Personal UV Meter, Scientific Data, Optix Tech Inc., http://www.safesun.com/scientific.html, downloaded May 1, 2003, pp. 1-3.

SafeSun Sensor, User's Manual, Optix Tech Inc., date unknown.

SafeSun, Personal UV Meter, "Technical Specifications", Optix Tech Inc., http://www.safesun.com/technical.html, downloaded Jul. 12, 2004, pp. 1-2.

SafeSun, Personal UV Meter, Experiments, Optix Tech Inc., http://www.safesun.com/experiments.html, downloaded Feb. 5, 2004, pp. 1-2.

Shades of Fun, Blinking Light Glasses, http://www.shadesoffun.com/Nov/Novpgs-14.html, downloaded Jul. 9, 2005, pp. 1-4.

SportLine Fitness Pedometer-Model 360, UltimateFatBurner Superstore, http://www.ultimatefatburner-store.com/ac_004.html, downloaded May 10, 2005, pp. 1-2.

Steele, Bonnie G. et al., "Bodies in motion: Monitoring daily activity and exercise with motion sensors in people with chronic pulmonary disease", VA Research & Development, Journal of Rehabilitation Research & Development, vol. 40, No. 5, Sep./Oct. 2003, Supplement 2, pp. 45-58.

Stevens, Kathy, "Should I Use a Pedometer When I Walk?", Healtheon/WebMD, Apr. 14, 2000.

Sundgot, Jørgen "2nd-gen Motorola Bluetooth headset", InfoSync World, Mar. 1, 2003, http://www.infosync.no/news/2002/n/2841.html, pp. 1-2.

SunSensors, Segan Industries, Inc., http://www.segan-ind.com/sunsensor.htm, downloaded Feb. 5, 2004, pp. 1-3.

SunUV™, Personal UV Monitor, APA Optics, Inc., http://www.apaoptics.com/sunuv/models.html, downloaded Dec. 20, 2003.

SunUV™, Personal UV Monitor User's Guide, APA Optics, Inc., 2003 pp. 1-52.

Talking Pedometer, Sportline, Inc., date unknown.

Top Silicon PIN Photodiode, PD93-21C, Technical Data Sheet, Everlight Electronics Co., Ltd., 2004, pp. 1-9.

UV Light Meter, UVA and UVB measurement, UV-340, Instruction Manual, Lutron, date unknown, pp. 1-5.

UV-Smart, UVA/B Monitor, Model EC-960-PW, Instruction Manual, Tanita Corporation of America, Inc., downloaded Nov. 16, 2001.

Vitaminder Personal Carb Counter with Convenient Key Chain, date unknown, pp. 1-4.

"With Racing Heart", Skaloud et al., GPS World, Oct. 1, 2001, http://www.gpsworld,com/gpsworld/content/printContentPopup.jsp?id=180 5, pp. 1-5.

Monitoring Athletes Performance—2002 Winter Olympic News from KSL, Jan. 23, 2002, http://2002.ksl.com/news-3885i, pp. 1-3.

* cited by examiner

EYEGLASSES FOR WIRELESS COMMUNICATIONS

CROSS-REFERENCE TO RELATED APPLICATIONS

This application claims priority of: (i) U.S. Provisional Patent Application No. 60/462,591, filed Apr. 15, 2003, and entitled "EYEGLASSES FOR WIRELESS COMMUNICATION," which is hereby incorporated herein by reference; (ii) U.S. Provisional Patent Application No. 60/509,631, filed Oct. 9, 2003, and entitled "TETHERED ELECTRICAL COMPONENTS FOR EYEGLASSES," which is hereby incorporated herein by reference; and (iii) U.S. Provisional Patent Application No. 60/527,565, filed Dec. 8, 2003, and entitled "ADAPTABLE COMMUNICATION TECHNIQUES FOR ELECTRONIC DEVICES," which is hereby incorporated herein by reference.

FIELD OF THE INVENTION

The present invention relates to eyeglasses and, more particularly, to eyeglasses that include wireless communications capabilities.

BACKGROUND OF THE INVENTION

Typically, to participate in wireless communications, a user holds a mobile phone (e.g., wireless or a cellular phone) against his ear to hear an audio communication received in a wireless manner. The user usually also speaks towards a microphone embedded in the mobile phone to participate in the audio communication, again in a wireless manner. More recently, to facilitate hands-free operation of mobile phones, head-sets have been produced and utilized. Typically, a head-set clips over or into an ear of the user to provide a speaker and a microphone in proximity to the ear and the mouth, respectively, of the user. Traditionally, the head-set was connected to the mobile phone by a cord (i.e., wire). In recent times, head-sets have been developed to operate in a wireless manner, without the need of a cord connected to the mobile phone. For example, one popular type of wireless head-set uses Bluetooth wireless transmissions to communicate between the head-set and the corresponding mobile phone.

Unfortunately, however, when the user desires to wear eyeglasses, a head-set, whether wired or wireless, might get in the way. For example, a user wearing eyeglasses may have difficulty utilizing a head-set that fits over the ear. Additionally, it can be cumbersome for the user to have both eyeglasses over his ears and an earpiece inserted into at least one ear. One previously proposed solution mounts or attaches a wireless head-set to the frame (e.g., arm) of the eyeglasses. However, even such an approach can still be cumbersome for users because various parts of the head-set have to be attached onto the frame of the eyeglasses. Also, this conventional approach is not considered to be aesthetically pleasing or attractive.

Accordingly, there is a need for improved wireless communication devices for users of eyeglasses.

SUMMARY OF THE INVENTION

The invention relates to eyeglasses that include wireless communication capabilities. The eyeglasses according to the invention are also referred to herein as "wireless eyeglasses." The wireless eyeglasses can allow a user to communicate with a communication device in a wireless and hands-free manner. The wireless eyeglasses may also include one or more operation indicators to signal operational status of the wireless communication circuitry.

The invention can be implemented in numerous ways, including a method, system, device, apparatus, and a computer readable medium. Several embodiments of the invention are discussed below.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

The invention relates to eyeglasses that include wireless communication capabilities. The eyeglasses according to the invention are also referred to herein as "wireless eyeglasses." The wireless eyeglasses can allow a user to communicate with a communication device in a wireless and hands-free manner. The wireless eyeglasses may also include one or more operation indicators to signal operational status of the wireless communication circuitry.

Embodiments of different aspects of the invention are discussed below with reference to FIGS. 1-6. However, those skilled in the art will readily appreciate that the detailed description given herein with respect to these figures is for explanatory purposes as the invention extends beyond these limited embodiments.

Figure 1:
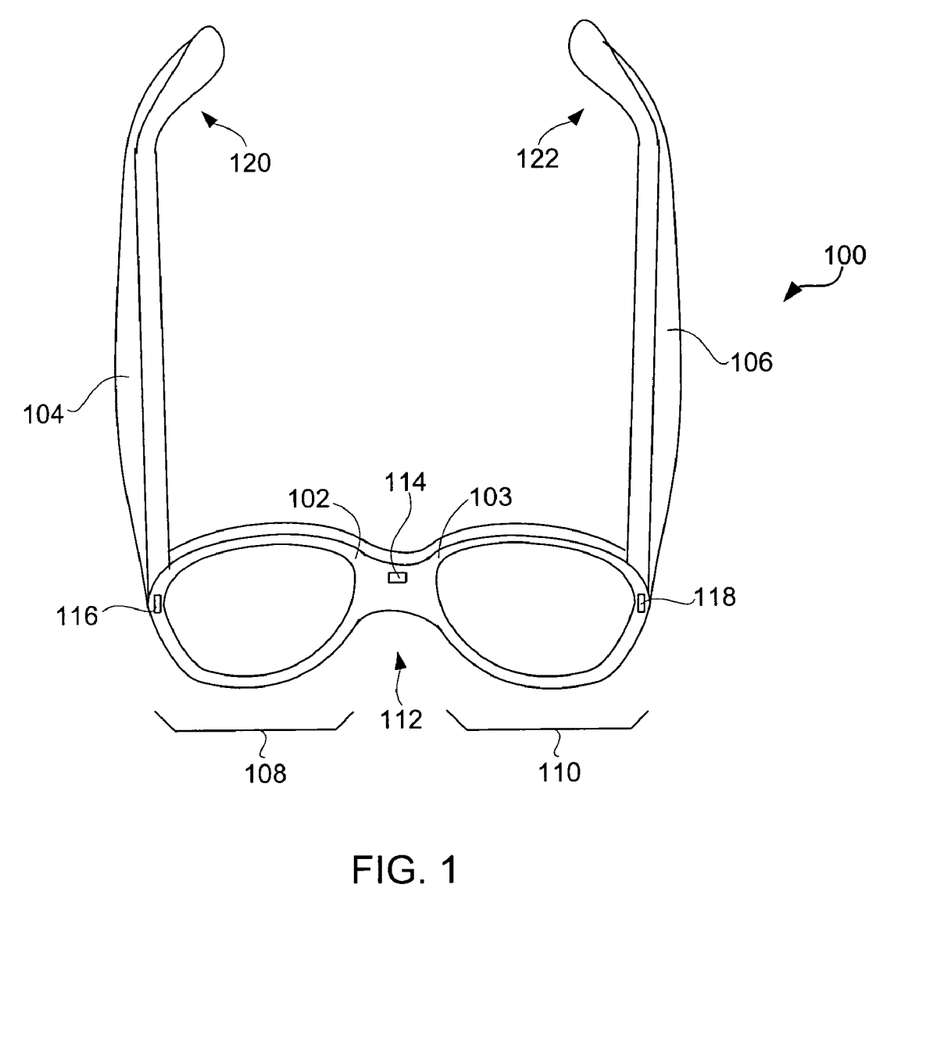
FIG. 1 is a perspective view of a pair of wireless eyeglasses according to one embodiment of the invention.

FIG. 1 is a perspective view of a pair of wireless eyeglasses 100 according to one embodiment of the invention. The wireless eyeglasses 100 include a frame 102. The frame 102 includes a front face 103 and arms 104 and 106. The arms 104 and 106 can be coupled to the front face 103 in a fixed manner, or by way of hinges (not shown), which allow the arms 104 and 106 to be folded, such as against the front face 103. The frame 102 also includes lens holders 108 and 110 for holding lenses. The lenses within the lense holders 108 and 110 can be no-power lenses, prescription power lenses, driving lenses, reading lenses, tinted lenses, or sunglass lenses. Alternatively, the lense holders 108 and 110 need not hold any lenses. The frame 102 further includes a bridge 112 between the two lens holders 108 and 110. The frame 102 can be made out of a variety of different materials, such as plastic or metal.

Still further, the frame 102 can include a microphone 114. In one embodiment, the frame further includes one or more operation indicators 116 and 118. The microphone 114 shown in FIG. 1 can be positioned in the vicinity of the bridge 112 of the frame 102, or at other areas of the frame 102 or the arms 104 and 106. For example, the microphone could be embedded in one or both of the arms 104 and 106, the front face 103, or the bottom portion of the lens holders 108 or 110. The operation indicators 116 and 118 can be provided on the front face 103 of the frame 102, or at other areas of the frame 102.

Each operation indicator can be implemented in a variety of different ways. For example, the operation indicator can be a light source, such as a light emitting diode (LED). There can be one LED coupling to one or more optical fibers, with each optical fiber guiding the light from the LED to different areas of the frame. The light source can produce light of any color. The operation indicator could also be provided by a small display, such as a liquid crystal display (LCD). The small display can display text and/or graphics.

The wireless eyeglasses 100 provide wireless communication capability for its user. In this regard, at least one of the arms 104 and 106 contains wireless communications circuitry that enables the wireless eyeglasses 100 to communicate in a wireless manner to a base unit. The base unit is, for example, a wireless communication device (e.g., mobile telephone), a portable computing device (e.g., Personal Digital Assistant (PDA), handheld computer or wearable computer), or an entertainment device (e.g., stereo system, television, media player (portable or stationary)).

In order for the user to make use of the wireless communication circuitry, the wireless eyeglasses 100 further includes at least one speaker. The at least one speaker can be provided in an over-the-ear portion 120 and 122 of one or both of the arms 104 and 106.

In one embodiment, the operation indicators 116 and 118 provide an indication of the operational state or condition of the wireless communication circuitry. For example, the operation indicators 116 and 118 can indicate whether or how the wireless communication circuitry is operation, such as whether such is in use. Although FIG. 1 depicts the operation indicators 116 and 118, it should be understood that, in general, the wireless eyeglasses 100 can use zero, one or a plurality of operation indicators. Also, as previously noted, the position or placement of the operation indicators can vary with implementation.

In one embodiment, at least the arms 104 and 106 of the frame can be non-translucent so that the wireless communications circuitry within the arm(s) is not visible through the arm(s). In another embodiment, at least a portion of the frame 102 is transparent (e.g., clear) so that circuitry, operation indicators, or other components internal to the frame 102 would be visible through at least the portion of the frame 102.

Figure 2A:
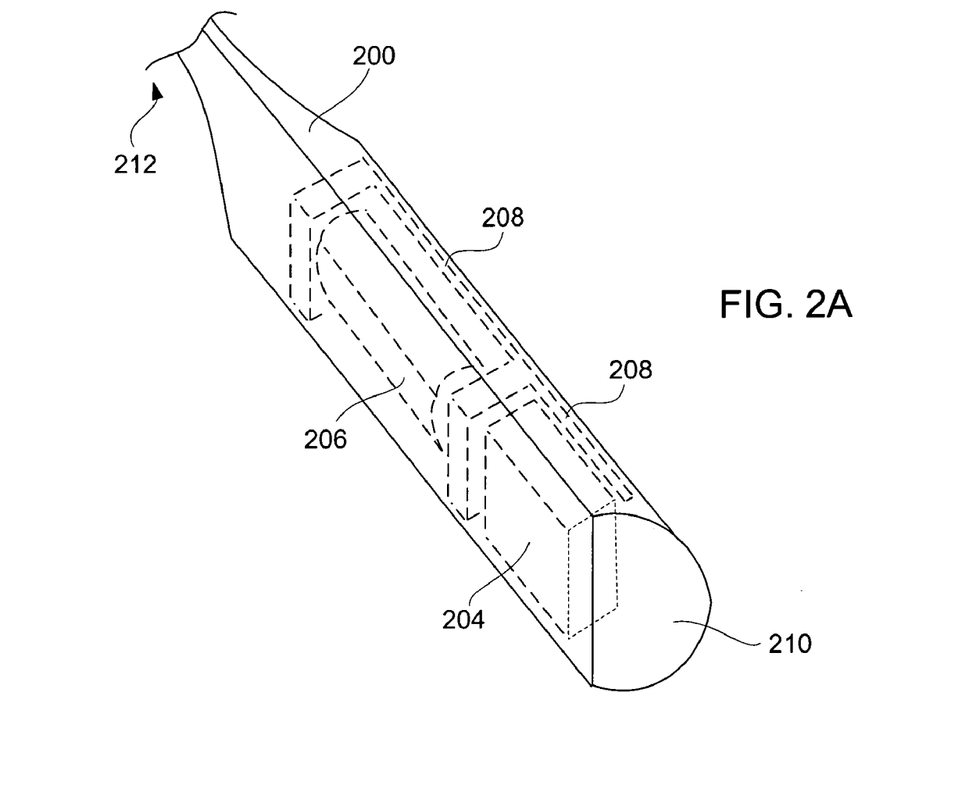
FIGS. 2A and 2B are diagrams of an arm for wireless eyeglasses according to one embodiment of the invention.
Figure 2B:
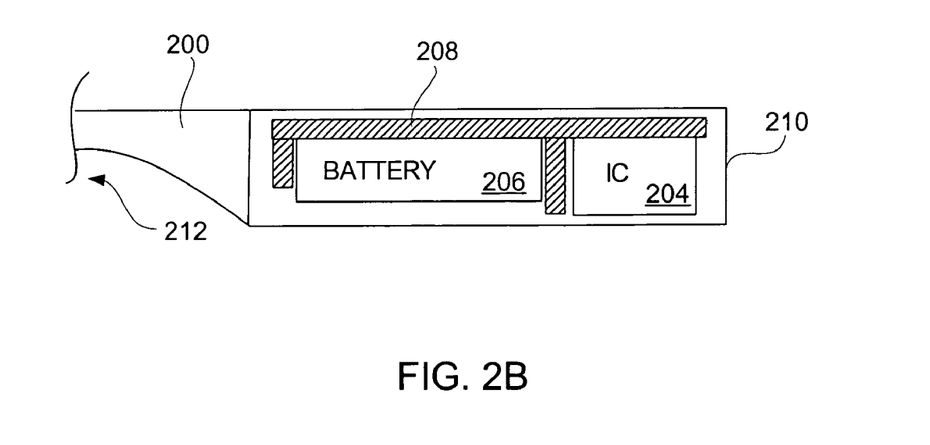

FIGS. 2A and 2B are diagrams of an arm 200 for wireless eyeglasses according to one embodiment of the invention. The arm 200 illustrated in FIGS. 2A and 2B is, for example, suitable for use as either or both of the arms 104 or 106 illustrated in FIG. 1. The arm 200 includes an internal compartment that contains an integrated circuit (IC) 204, a battery 206 and a printed circuit board (PCB) 208. The IC 204 is mounted on the PCB 208. The IC 204 and the PCB 208 provide the wireless communication circuitry for the wireless eyeglasses 100. The battery 206 provides a power source for the wireless communication circuitry. The wireless communication circuitry also normally makes use of and couples to an antenna (not shown). The antenna can be included within the arm 200, or other areas (e.g., front face 103) within the wireless eyeglasses. Although it is preferred that the antenna be provided internal to the frame 102, the antenna can also be provided external to (but coupled to) the frame 102.

In one embodiment, the IC 204, the battery 206 and the PCB 208 are all contained within the arm 200 such that they are not visible from the outside of the arm 200.

The arm 200 has an end 210 that couples to the front portion of the frame 102. An opposite end of the arm 200 includes an ear portion 212 (not shown) that fits over the ear of the user. In one embodiment, the ear portion 212 includes one or more speakers. Although not shown in FIGS. 2A and 2B, the wireless communication circuitry also likely makes use of or includes wires to couple to the one or more speakers, the one or more microphones, and one or more antenna, all of which reside within or are coupled to the wireless eyeglasses.

Figure 3A:
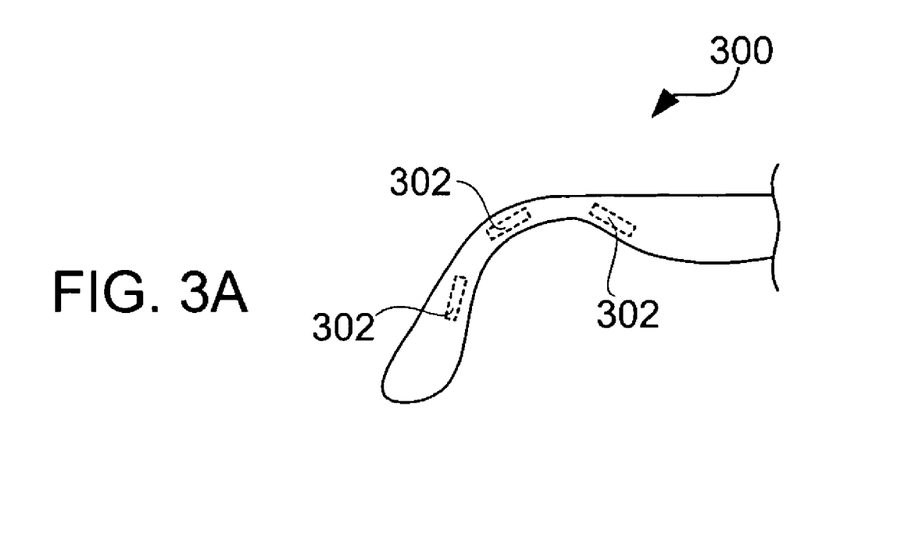
FIG. 3A illustrates an ear portion of an arm according to one embodiment of the invention.

FIG. 3A illustrates an ear portion 300 of an arm according to one embodiment of the invention. As an example, the ear portion 300 is suitable for use as the ear portion 212 of the arm 200 illustrated in FIGS. 2A and 2B. The ear portion 300 includes at least one speaker 302 embedded within the ear portion 300. Depending on the design, the one or more speakers 302 within the ear portion 300 may not be visible from the outside of the ear portion 300.

Figure 3B:
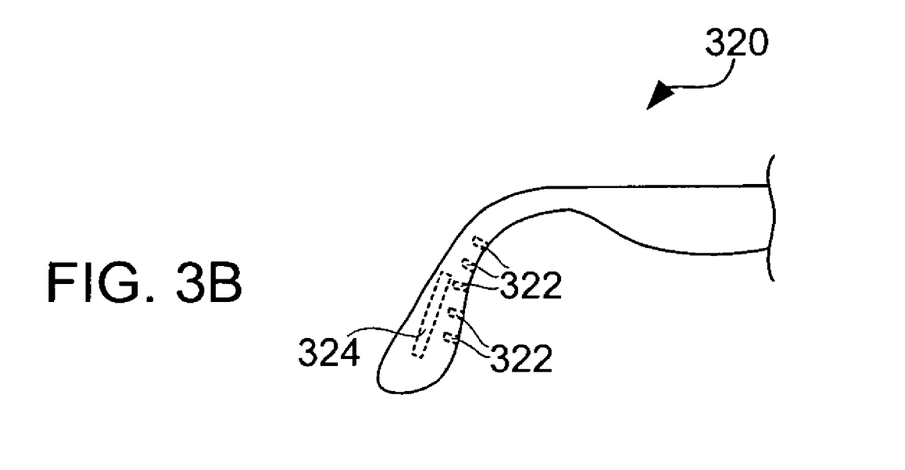
FIG. 3B is a diagram of an ear portion of an arm according to another embodiment of the invention.

FIG. 3B is a diagram of an ear portion 320 of an arm according to another embodiment of the invention. As an example, the ear portion 300 is also suitable for use as the ear portion 212 of the arm 200 illustrated in FIGS. 2A and 2B. The ear portion 320 includes a number of openings (or slits) 322. The openings 322 provide a conduit for audio signals produced by at least one speaker 324 that resides within the ear portion 320. In FIG. 3B, the openings 322 are normally visible to the user from the outside of the ear portion 320. However, even the openings 322 of the ear portion 320 could be made essentially non-visible from the outside by placing a thin film over the openings 322. The thin film would allow the audio signals to pass through the thin film, but prevents the openings to be exposed. This prevents dirt from being trapped in the openings, and may also provide a more aesthetically pleasing appearance.

The speakers 302, 324 can be of a variety of different types. One type of speaker that can be utilized is a piezoelectric speaker. Another type of speaker would be positioned over the ear proximate to, but may or may not be in contact with, the skull bones of the user. The audio sound can then vibrate to the user's inner ear via the skull bones—such can be referred to as a bone-type speaker. One advantage of such a speaker arrangement is reduced likelihood that bystanders are able to hear the audio sounds produced by the bone-type speaker. It should be noted that the skin between the skull-bone and the speaker absorbs sound and thus may not be suitable for high noise environments unless the sound power output can be significant.

Hence, in one embodiment, the wireless communication circuitry, the battery, the antenna, and the speaker can all be within or integral with the frame or arms of a pair of eyeglasses. As a result, the style and design of the eyeglasses can be progressive and stylish, yet the wireless communication capability of the eyeglasses will not be apparent.

The wireless eyeglasses are, in effect, eyeglasses with wireless communication circuitry and a power source, such as a battery. The wireless eyeglasses serve not only for vision purposes, but in effect provide a headset operation, thus allowing wireless communication to be performed by the user in a hands-free manner.

The wireless communication circuitry and the power source can be embedded internally into one or both of the arms of the eyeglasses. In such a case, at least one of the arms would have an opening such that the circuitry and battery could be embedded internally to at least one arm. In one embodiment, the arm is substantially tubular with a hollow portion that allows for the placement of the wireless communication circuitry and the power source internal to the arm. The circuitry and the power source are then not visually transparent from the outside. In another embodiment, if the battery and circuitry are provided in one of the arms, the other of the arms can include a compensation weight to balance the weight of the other arm of the frame. In another embodiment, the weight can be minimized or eliminated if the weight of the battery and the circuitry are substantially equally distributed to internal portions of both of the arms.

The wireless eyeglasses can further include automatic activation/deactivation of at least a portion of the wireless communication circuitry. In one embodiment, activation/deactivation can be automatically controlled by a sensor that determines whether the user is wearing the eyeglasses. In another embodiment, activation/deactivation can be based on whether an incoming call is present. For example, on receiving an incoming call, the wireless eyeglasses can automatically activate (or wake-up) to engage in wireless communication. Activation/deactivation can also be triggered by a button provided on the frame of the wireless eyeglasses. The button can serve to accept or drop a call. One advantage of providing automatic activation/deactivation is that the wireless eyeglasses are able to be power managed so that power consumption is reduced and battery life is extended.

Figure 4:
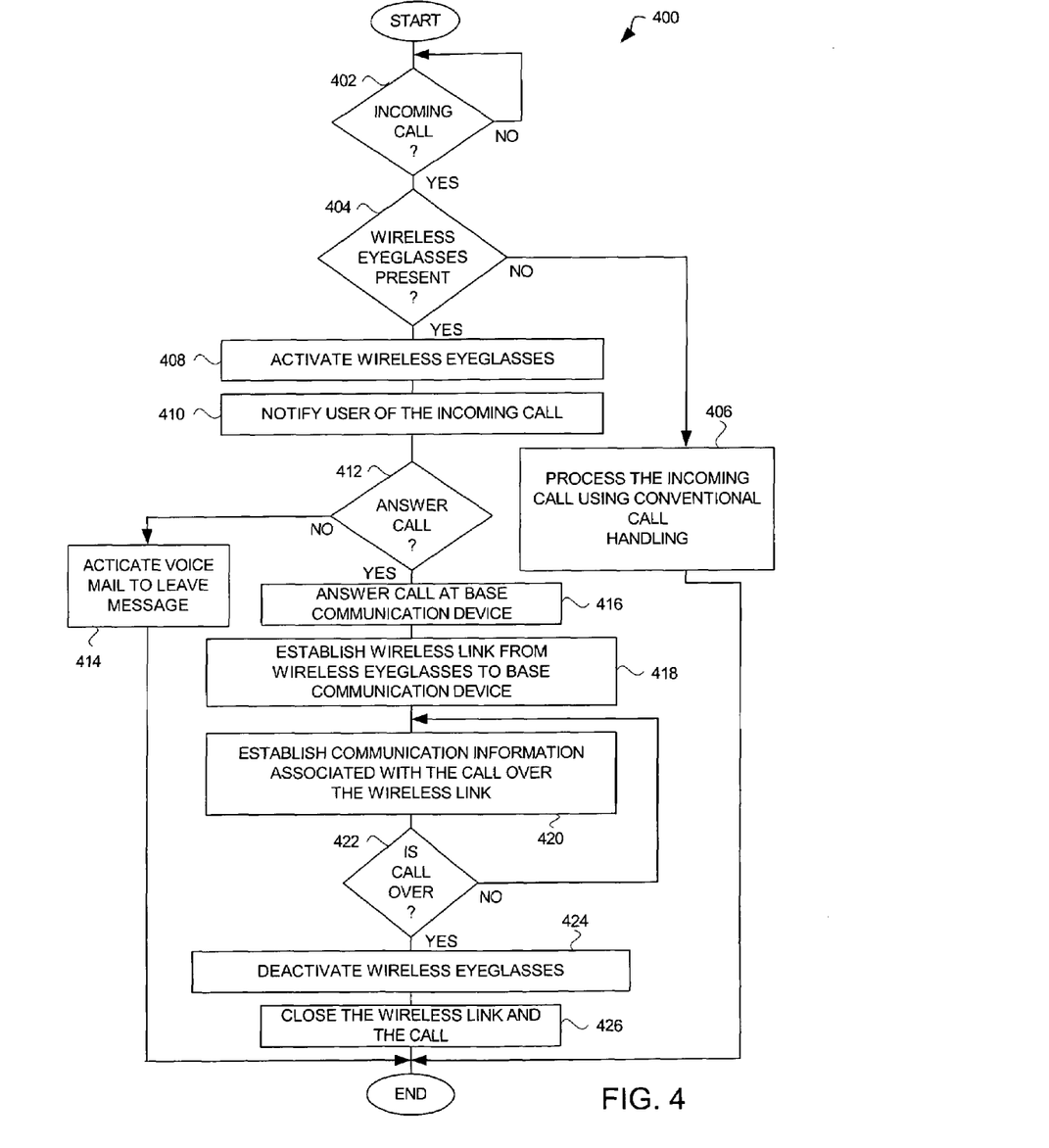
FIG. 4 is a flow diagram of call processing according to one embodiment of the invention.

FIG. 4 is a flow diagram of call processing 400 according to one embodiment of the invention. The call processing 400 is performed using wireless glasses, namely, eyeglasses having wireless communication capabilities. For example, the wireless eyeglasses can be the wireless eyeglasses shown in FIG. 1.

The call processing 400 begins with a decision 402 that determines whether a call is incoming. When the decision 402 determines that a call is not incoming, then the call processing 400 waits for such a call. Once the decision 402 determines that a call is incoming, the decision 404 determines whether wireless eyeglasses, namely, eyeglasses having wireless communication capabilities, are present. When the decision 404 determines that wireless eyeglasses are not present, then the incoming call is processed 406 using conventional call handling. In this case, since wireless eyeglasses are not present, a base unit proceeds to handle the call in a conventional manner without the benefit of wireless eyeglasses. In this embodiment, the base unit supports two-way communication, such as an audio conversation between two persons. For example, the base unit can be a mobile telephone, a computer, a cordless phone, a speaker phone, a voice-activated device, etc.

On the other hand, when the decision 404 determines that wireless eyeglasses are present, then the wireless eyeglasses are activated 408. Here, the wireless communications capability of the eyeglasses is activated (e.g., powered-up, enabled, or woken-up). The user of the wireless eyeglasses is then notified 410 of the incoming call. In one embodiment, the notification to the user of the incoming call can be achieved by an audio sound produced by the wireless eyeglasses (via a speaker). Alternatively, the user of the wireless eyeglasses could be notified by a vibration of the wireless eyeglasses, or a visual (e.g., light) indication provided by the wireless eyeglasses. Alternatively, the base unit could include a ringer that provides audio sound and/or or vibration indication to signal an incoming call. Still another alternative is that the wireless eyeglasses could provide a tactile action to the user's head so as to notify the user.

Next, a decision 412 determines whether the incoming call has been answered. When the decision 412 determines that the incoming call has not been answered, the base unit can activate 414 a voice message informing the caller to leave a message or instructing the caller as to the unavailability of the recipient.

On the other hand, when the decision 412 determines that the incoming call is to be answered, the call can be answered 416 at the base unit. Then, a wireless link is established 418 from the wireless eyeglasses to the base unit. The wireless link is, for example, a radio communication link such as utilized with Bluetooth or Wi-Fi networks. Thereafter, communication information associated with the call can be exchanged 420 over the wireless link. Here, the base unit receives the incoming call, and communicates wirelessly with the wireless eyeglasses such that communication information is provided to the user via the wireless eyeglasses. The user of the wireless eyeglasses is accordingly able to communicate with the caller by way of the wireless eyeglasses and, thus, in a hands-free manner.

A decision 422 then determines whether the call is over (completed). When the decision 422 determines that the call is not over, the call processing 400 returns to repeat the operation 420 and subsequent operations so that the call can continue. On the other hand, when the decision 422 determines that the call is over, then the wireless eyeglasses are deactivated 424, and the wireless link and the call are ended 426. The deactivation 424 of the wireless eyeglasses can place the wireless eyeglasses in a reduced-power mode. For example, the deactivation 424 can power-down, disable, or sleep the wireless communication capabilities (e.g., circuitry) of the wireless eyeglasses. Following the operation 426, as well as following the operations 406 and 414, the call processing 400 for the particular call ends.

Although the unit utilized with the call processing performs two-way communications, other embodiment of the invention can utilize one-way communications (or at least substantially one-way communications). For example, a base unit might produce, receive or play audio content such that the audio content is transmitted to the wireless eyeglasses in a wireless manner. The wireless eyeglasses then serve as a receiver for the audio content from the base unit.

In general, the base unit can be a communication device with which wireless eyeglasses can communicate. The base unit outputs audio to the wireless eyeglasses in a wireless manner.

In another embodiment, the base unit can also be incorporated into the wireless eyeglasses. For example, the wireless eyeglasses can internally enclose a mobile telephone. Such wireless eyeglasses can then operate as a mobile telephone, such as through use of voice-activated commands.

Figure 5:
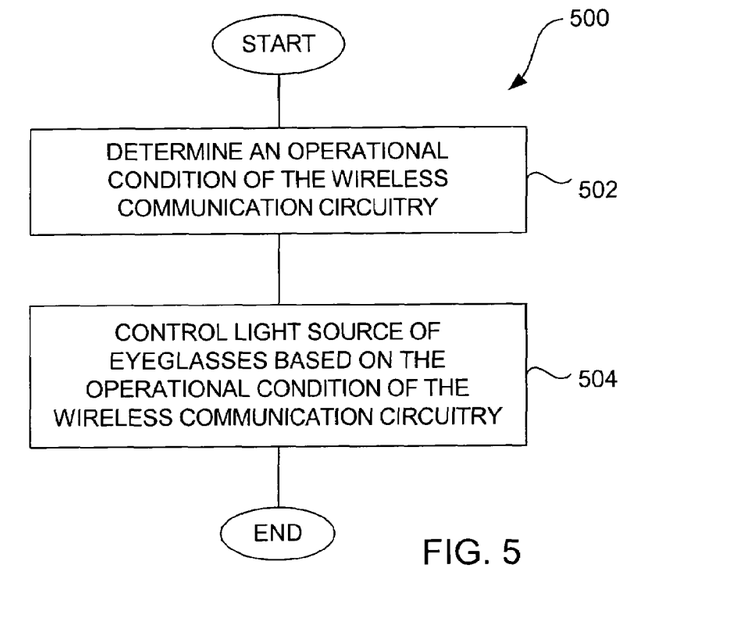
FIG. 5 is a flow diagram of wireless eyeglass operational condition processing according to one embodiment of the invention.

FIG. 5 is a flow diagram of wireless eyeglass operational condition processing 500 according to one embodiment of the invention. The wireless eyeglass operational condition processing 500 is performed by wireless eyeglasses that include wireless communication circuitry and at least one operation indicator.

The wireless eyeglass operational condition processing 500 initially determines 502 an operational condition of the wireless communication circuitry. The operational condition of the wireless communication circuitry can, for example, indicate whether a call is incoming, whether a call is ongoing, or whether the wireless communication circuitry is in use. Next, the operation indicator of the eyeglasses is controlled 504 based on the operational condition of the wireless communication circuitry. The at least one operation indicator of the eyeglasses can be positioned in a variety of different places of the eyeglasses. In one embodiment, the operation indicator serves as an indicator to others that the user of the wireless eyeglasses is engaged in a call. In another embodiment, the indicator can signal to the wearer of the wireless eyeglasses that a call is incoming. Following the operation 504, the wireless eyeglass operational condition processing 500 is complete and ends.

Figure 6:
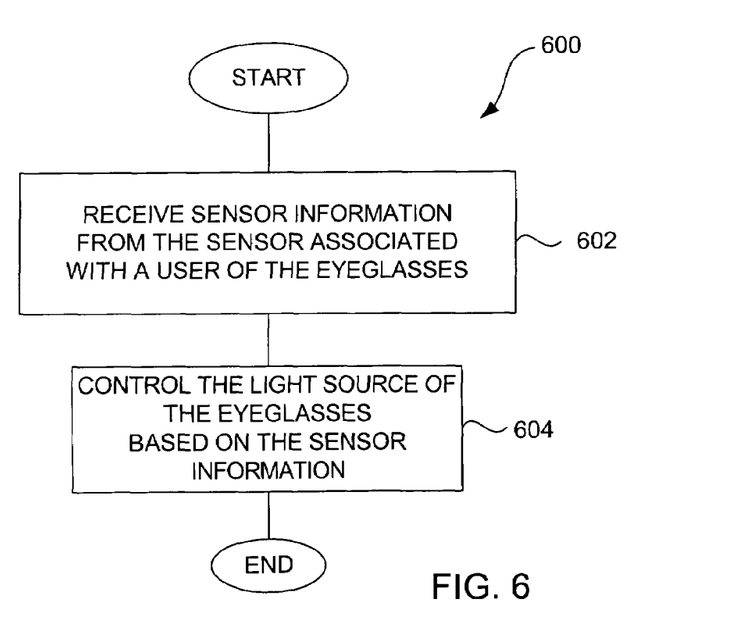
FIG. 6 is a flow diagram of wireless eyeglasses sensor processing according to one embodiment of the invention.

FIG. 6 is a flow diagram of wireless eyeglasses sensor processing 600 according to one embodiment of the invention. The wireless eyeglasses sensor processing 600 is performed by wireless eyeglasses that include wireless communication circuitry and at least one sensor. Optionally, the wireless eyeglasses further include at least one operation indicator.

The wireless eyeglasses sensor processing 600 initially receives 602 sensor information from the sensor. The sensor information is typically associated with the user of the eyeglasses. There can be different types of sensors incorporated or embedded into the wireless glasses. For example, the sensor can be a temperature sensor configured to sense the temperature of the user. The sensor can be a humidity sensor configured to sense how much the user has been perspiring. The sensor can sense whether at least one of the user's eyes is open or not. The sensor can sense if the user is crying. In a general sense, the sensor information can, for example, pertain to physical and/or emotional conditions of the user.

The operation indicator of the eyeglasses can then be controlled 604 based on the sensor information. Following the operation 604, the wireless eyeglass sensor processing 600 is complete and ends.

The information provided by the operation indicator of the eyeglasses can serve various other purposes. For example, the indication can represent physical or emotional status of the user of the wireless eyeglasses, and can provide an indication of the health or mood of the user of the wireless eyeglasses.

Although the at least one sensor for acquiring the sensor information can be provided on or within the wireless eyeglasses, it should be noted that the sensor could also be remotely located from the wireless eyeglasses and communicated therewith in a wireless manner. Such wireless sensors can increase the type of sensor information that can be acquired and utilized by wireless eyeglasses.

In one embodiment, the sensor can be a position sensor that provides position information. The position sensor can, for example, be a GPS receiver that is able to fully or partially determine position of the wireless eyeglasses or its user. The position sensor can be integral with the wireless communication circuitry and thus also provided within the arm of the frame of the wireless eyeglasses.

In another embodiment, the wireless eyeglasses can further include a memory module. The memory module provides non-volatile data storage. For example, the memory module can be a flash memory device. The memory module can store the sensor information (even over an extended period of time). Such memory module can be remotely interrogated using the wireless communication circuitry, or can be accessed through a connection with the wireless eyeglasses.

Further, in an alternative embodiment, the output of the operation indicator (e.g., used with the eyeglasses sensor processing 600) can be audio that is output to the one or more speakers of the wireless glasses. Such audio output can signal the user using natural language, voice synthesis, pre-recorded messages, etc.

Another feature of the wireless eyeglasses that may be provided is one or more electrical connections on the frame of the wireless eyeglasses so as to facilitate electrical connection with a battery charger. For example, when the power source for the wireless eyeglasses is a rechargeable battery, the ability to charge the battery without removing the battery from the frame (e.g., arm) of the wireless eyeglasses is advantageous. Hence, in one embodiment, the frame of the eyeglasses includes at least one connector or conductive element (e.g., terminal, pin, pad, trace, etc.) so that the electrical coupling between the rechargeable battery and the charger can be achieved. In this regard, the electrical connector or conductive element is provided on the frame of the eyeglasses and electrically connected to the battery. The placement of the electrical connector or conductive element on the frame serves to allow the wireless eyeglasses to be simply placed within a charger and consequently have the electrical connector or conductive element be in electrical contact with a counterpart or corresponding electrical connector or conductive element of the charger.

In one embodiment, the charger can be considered a docking station, upon which the wireless eyeglasses are docked so that the battery within the wireless eyeglasses is able to be charged. Hence, the frame of the wireless eyeglasses can likewise include an electrical connector or conductive element that facilitates electrical connection to the docking station when docked.

In one embodiment, the electrical connection(s) can be used to allow information stored in the eyeglasses to be accessed or queried by a device. For example, when the eyeglasses include a memory module, the memory module can by accessed to read data (e.g., status information) stored therein.

Another feature of the eyeglasses that may be provided is a clear frame. For example, at least a portion of the frame of the eyeglasses can be clear (transparent). This can provide not only a unique design appearance but can also facilitate lighting of the frame. For example, operation indicators that are light sources, can be completely internal to the frame and produce light in complex shapes, patterns, etc. through light pipes, fiber optics, LEDs, etc. Further, the eyeglasses can have numerous light sources to display patterns, and the patterns can coordinate or be synchronous with audio sounds, etc.

The various embodiments, implementations and features of the invention noted above can be combined in various ways or used separately. Those skilled in the art will understand from the description that the invention can be equally applied to or used in other various different settings with respect to various combinations, embodiments, implementations or features provided in the description herein.

The invention can be implemented in software, hardware or a combination of hardware and software. A number of embodiments of the invention can also be embodied as computer readable code on a computer readable medium. The computer readable medium is any data storage device that can store data which can thereafter be read by a computer system. Examples of the computer readable medium include read-only memory, random-access memory, CD-ROMs, magnetic tape, optical data storage devices, and carrier waves. The computer readable medium can also be distributed over network-coupled computer systems so that the computer readable code is stored and executed in a distributed fashion.

The advantages of the invention are numerous. Different embodiments or implementations may yield different advantages. One advantage of the invention is that eyeglasses can provide hands-free wireless communications capability. Another advantage of the invention is that wireless communications capability can be provided integral to eyeglasses. Still another advantage of the invention is that the wireless communication capability can be provided for eyeglasses without substantial interference to style or design choices, and thus without being apparent that the eyeglasses support wireless communications. Yet another advantage of the invention is that one or more operation indicators can be provided on or within a frame of the eyeglasses for functional reasons (e.g., to indicate operational condition of communication circuitry or to indicate condition of user of the eyeglasses), and/or for ornamental purposes also, such as light patterns. Still yet another advantage of the invention is that eyeglasses can also include one or more sensors, can provide storage capabilities for sensor information.

Numerous specific details are set forth in order to provide a thorough understanding of the present invention. However, it will become obvious to those skilled in the art that the invention may be practiced without these specific details. The description and representation herein are the common meanings used by those experienced or skilled in the art to most effectively convey the substance of their work to others skilled in the art. In other instances, well-known methods, procedures, components, and circuitry have not been described in detail to avoid unnecessarily obscuring aspects of the present invention.

In the foregoing description, reference to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

The many features and advantages of the present invention are apparent from the written description and, thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method for operating a pair of eyeglasses having wireless communication circuitry and at least one operation indicator, said method comprising:
   monitoring, via electronic circuitry at least partially embedded in the glasses, the wireless communication circuitry to determine an operational condition of the wireless communication circuitry; and
   controlling, by the electronic circuitry, the at least one operation indicator based on the operational condition of the wireless communication circuitry as determined by said monitoring,
   wherein the operational condition Indicates at least whether the wireless communication circuitry is in use,
   wherein the electronic circuitry further couples to at least one sensor,
   wherein said method further comprises receiving sensor information from the at least one sensor, the sensor being operable to provide sensor information that pertains to a physical condition of the user, and
   wherein said controlling operates to control the at least one operation indicator based on the sensor information and based on the operational condition of the wireless communication circuitry.

2. A method as recited in claim 1, wherein the operational condition indicates at least that the wireless communication circuitry is operating on an incoming call.

3. A method as recited in claim 1, wherein the at least one sensor is internal to the eyeglasses.

4. A method as recited in claim 1, wherein the at least one sensor is attached to the eyeglasses.

5. A method as recited in claim 1, wherein the at least one sensor is remote from the eyeglasses, and wherein the sensor information from the sensor is wirelessly supplied to the eyeglasses.

6. A method for operating a pair of eyeglasses having wireless communication circuitry and at least one operation indicator, said method comprising:
   monitoring, via electronic circuitry at least partially embedded in the glasses, the wireless communication circuitry to determine an operational condition of the wireless communication circuitry; and
   controlling, by the electronic circuitry, the at least one operation indicator based on the operational condition of the wireless communication circuitry as determined by said monitoring,
   wherein the operational condition indicates at least whether the wireless communication circuitry is in use,
   wherein the electronic circuitry further operatively couples to at least one sensor,
   wherein said method further comprises receiving sensor information from the at least one sensor, the sensor being operable to provide sensor information that pertains to a mood of the user, and
   wherein said controlling operates to control the at least one operation indicator based on the sensor information and based on the operational condition of the wireless communication circuitry.

7. A method as recited in claim 6, wherein the at least one sensor is internal to the eyeglasses.

8. A method as recited in claim 6, wherein the at least one sensor is attached to the eyeglasses.

9. A method as recited in claim 6, wherein the at least one sensor is remote from the eyeglasses, and wherein the sensor information from the sensor is wirelessly supplied to the eyeglasses.

10. A method for operating a pair of eyeglasses having wireless communication circuitry and at least one indicator, the eyeglasses further operatively coupling to at least one sensor, said method comprising:
    monitoring, via electronic circuitry, the wireless communication circuitry to determine an operational condition of the wireless communication circuitry, the operational condition indicating at least whether the wireless communication circuitry is in use;
    receiving sensor information from the at least one sensor; and
    controlling, by the electronic circuitry, the at least one indicator based on the operational condition of the wireless communication circuitry as determined by said monitoring as well as based on the sensor information as obtained by said receiving,
    wherein the wireless communication circuitry and the electronic circuitry are at least partially internal to the eyeglasses.

11. A method as recited in claim 10, wherein the operational condition indicates at least that the wireless communication circuitry Is operating on an incoming call.

12. A method as recited in claim 10, wherein the at least one indicator comprises at least one light source, and wherein the at least one light source illuminates light in a predetermined manner when the wireless communication circuitry is in use.

13. A method as recited in claim 10, wherein the at least one sensor is internal to the eyeglasses.

14. A method as recited in claim 10, wherein the at least one sensor is attached to the eyeglasses.

15. A method as recited in claim 10, wherein the at least one sensor is physically separate from the eyeglasses, and wherein the sensor Information from the sensor is wirelessly supplied to the eyeglasses.

16. A method as recited in claim 10, wherein the sensor information from the at least one sensor pertains to an emotional condition of a user of the eyeglasses.

17. A method as recited in claim 10, wherein the sensor information from the at least one sensor pertains to a physical condition of the user.

18. A method as recited in claim 10, wherein the sensor information from the at least one sensor is for a position of the eyeglasses and/or a position of a user of the eyeglasses.

19. A method as recited in claim 10, wherein the sensor comprises a position sensor that provides position information.

20. A method as recited in claim 10, wherein the at least one indicator is at least partially internal to the eyeglasses.

21. A method as recited in claim 10, wherein the eyeglasses interact with a base unit, and wherein the at least one sensor is operatively connected to the base unit.

22. A method as recited in claim 10, wherein the at least one indicator comprises a visual Indicator configured to controllably provide at least one or more visual indications.

23. A method as recited in claim 10, wherein the at least one indicator comprises an audio indicator configured to controllably provide at least one or more audio indications.

24. A method as recited in claim 10, wherein the eyeglasses are configured to operate with at least one speaker, and wherein the at least one speaker produces audio output for the wireless communication circuitry.

25. A method as recited in claim 10, wherein said controlling of the at least one indicator comprises receiving electrical signals pertaining to the operational condition of the wireless communication circuitry as determined by said monitoring and receiving electrical signals pertaining to the sensor information as obtained by said receiving.

* * * * *

UNITED STATES PATENT AND TRADEMARK OFFICE
CERTIFICATE OF CORRECTION

| | | |
|---|---|---|
| PATENT NO. | : 7,792,552 B2 | Page 1 of 1 |
| APPLICATION NO. | : 10/822218 | |
| DATED | : September 7, 2010 | |
| INVENTOR(S) | : Thomas et al. | |

It is certified that error appears in the above-identified patent and that said Letters Patent is hereby corrected as shown below:

In the Claims

Column 9, line 53 (claim 1, line 12) "wherein the operational condition Indicates at least" should be --wherein the operational condition indicates at least--.

Column 10, lines 60-61 (claim 11, lines 2-3) "communication circuitry Is operating on an incoming call." should be --communication circuitry is operating on an incoming call.--.

Column 11, line 5 (claim 15, line 3) "wherein the sensor Information from the sensor" should be --wherein the sensor information from the sensor--.

Column 12, line 5 (claim 22, line 2) "indicator comprises a visual Indicator configured" should be --indicator comprises a visual indicator configured--.

Signed and Sealed this
Tenth Day of May, 2016

Michelle K. Lee
*Director of the United States Patent and Trademark Office*